(12) United States Patent
Phillips (10) Patent No.: US 10,719,877 B2
(45) Date of Patent: Jul. 21, 2020

(54) CONVERTIBLE UNIT INVESTMENT TRUST TO INDEX EXCHANGE-TRADED FUND

(71) Applicant: John Phillips, Wheaton, IL (US)

(72) Inventor: John Phillips, Wheaton, IL (US)

(73) Assignee: ACESHARES LLC, Wheaton, IL (US)

( * ) Notice: Subject to any disclaimer, the term of this patent is extended or adjusted under 35 U.S.C. 154(b) by 441 days.

(21) Appl. No.: 15/200,423

(22) Filed: Jul. 1, 2016

(65) Prior Publication Data

US 2017/0004580 A1  Jan. 5, 2017

Related U.S. Application Data

(60) Provisional application No. 62/187,321, filed on Jul. 1, 2015.

(51) Int. Cl.
*G06Q 40/04* (2012.01)
*G06Q 40/06* (2012.01)

(52) U.S. Cl.
CPC ............ *G06Q 40/06* (2013.01); *G06Q 40/04* (2013.01)

(58) Field of Classification Search
CPC .................................................. G06Q 20/042
USPC .......................................................... 705/37
See application file for complete search history.

(56) References Cited

U.S. PATENT DOCUMENTS

| | | | | |
|---|---|---|---|---|
| 7,444,300 B1* | 10/2008 | Broms | .................. | G06Q 40/00 705/35 |
| 7,496,531 B1* | 2/2009 | Gastineau | .............. | G06Q 40/00 705/35 |
| 7,689,501 B1* | 3/2010 | Gastineau | .............. | G06Q 40/04 705/36 R |
| 7,865,426 B2* | 1/2011 | Volpert | .................. | G06Q 40/00 705/35 |
| 8,131,621 B1* | 3/2012 | Gastineau | .............. | G06Q 40/06 705/36 R |
| 8,306,892 B1* | 11/2012 | Gross | ..................... | G06Q 40/06 705/36 R |
| 8,452,682 B1* | 5/2013 | Gastineau | .............. | G06Q 40/06 705/36 R |
| 8,655,765 B1* | 2/2014 | Gastineau | .............. | G06Q 40/04 705/35 |
| 2002/0128947 A1* | 9/2002 | Sauter | .................. | G06Q 20/042 705/37 |
| 2002/0161684 A1* | 10/2002 | Whitworth | ............ | G06Q 40/04 705/36 R |
| 2005/0216407 A1* | 9/2005 | Feldman | .............. | G06Q 20/108 705/42 |

(Continued)

*Primary Examiner* — William J Jacob
(74) *Attorney, Agent, or Firm* — Richards Patent Law P.C.

(57) ABSTRACT

A computer-implemented method for providing an exchange traded fund comprising the steps of: providing a unit investment trust including a plurality of ownership units, wherein the unit investment trust includes a portfolio of securities composed in accordance with an index; distributing the ownership units of the unit investment trust to one or more investors; providing an exchange traded fund including a plurality of ownership shares; upon the occurrence of a conversion event, tendering the portfolio of securities to the exchange traded fund in return for an in-kind distribution of the plurality of ownership shares; and distributing the plurality of ownership shares to the one or more investors according to a predetermined ratio of ownership units to ownership shares.

7 Claims, 7 Drawing Sheets

(56) References Cited

U.S. PATENT DOCUMENTS

| | | | |
|---|---|---|---|
| 2006/0287938 A1* | 12/2006 | Sherman | G06Q 40/00 |
| | | | 705/35 |
| 2008/0147464 A1* | 6/2008 | Sauter | G06Q 20/042 |
| | | | 705/37 |
| 2009/0043713 A1* | 2/2009 | Weber | G06Q 40/00 |
| | | | 705/36 R |
| 2010/0030799 A1* | 2/2010 | Parker | G06Q 40/04 |
| | | | 705/37 |
| 2013/0191307 A1* | 7/2013 | Freeman | G06Q 40/06 |
| | | | 705/36 R |
| 2014/0012777 A1* | 1/2014 | Freeman | G06Q 40/06 |
| | | | 705/36 R |
| 2016/0005121 A1* | 1/2016 | Kapoor | G06O 40/04 |
| | | | 705/37 |

\* cited by examiner

CONVERTIBLE UNIT INVESTMENT TRUST TO INDEX EXCHANGE-TRADED FUND

CROSS-REFERENCE TO RELATED APPLICATIONS

This application incorporates by reference and claims the benefit of priority to U.S. Provisional Patent Application No. 62/187,321 filed Jul. 1, 2015.

BACKGROUND OF THE INVENTION

The present subject matter relates generally to a method for creating an index exchange-traded fund using a convertible unit investment trust. More specifically, the present invention relates to incubating an exchange-traded fund with a convertible Unit Investment Trust that converts to the exchange-traded fund upon meeting a predetermined conversion benchmarks.

A "unit investment trust," commonly referred to as a "UIT," is a type of investment company. Generally, an "investment company" is a company (corporation, business trust, partnership, or limited liability company) that issues securities and is primarily engaged in the business of investing in securities. An investment company invests the money it receives from investors on a collective basis, and each investor shares in the profits and losses in proportion to the investor's interest in the investment company. The performance of the investment company will be based on, but not necessarily identical to, the performance of the securities and other assets that the investment company owns. Two other types of common investment companies are mutual funds and closed-end funds.

UITs have traditional and distinguishing characteristics. A UIT typically issues redeemable securities (or "units"), like a mutual fund, which means that the UIT will buy back an investor's "units," at the investor's request, at their approximate net asset value (or NAV). Some exchange-traded funds (ETFs) are structured as UITs. Under SEC exemptive orders, shares of ETFs are redeemable in very large blocks (blocks of 50,000 shares, for example) and are traded on a secondary market. Typically a UIT will make a one-time "public offering" of a specific, fixed number of units (like closed-end funds). Many UIT sponsors will maintain a secondary market, which allows owners of the UIT units to sell them back to the sponsors and allow other investors to buy these UIT units from the sponsors. A UIT will have a termination date (a date when the UIT will terminate and dissolve, also referred to a maturity date) that is established when the UIT is created (although some may terminate more than fifty years after they are created). In the case of a UIT investing in bonds, for example, the termination date may be determined by the maturity date of the bond investments. When a UIT terminates, any remaining investment portfolio securities are sold and the proceeds are paid to the investors. A UIT does not actively trade its investment portfolio. A UIT buys a relatively fixed portfolio of securities (for example, five, ten, or twenty specific stocks or bonds), and holds them with little or no change for the life of the UIT. Because the investment portfolio of a UIT generally is fixed, investors know more or less what they are investing in for the duration of their investment. Investors will find the portfolio securities held by the UIT listed in its prospectus. Finally, a UIT does not have a board of directors, corporate officers, or an investment adviser to render advice during the life of the trust. Because a UIT had excellent performance last year does not necessarily mean that it will duplicate that performance in the future. For example, market conditions can change, and this year's winning UIT could be next year's loser.

An Exchange Traded Funds (ETF) is a fund that tracks an index like the NASDAQ-100 Index™, S&P 500™, Dow Jones™, etc. When you buy shares of an ETF, you are buying shares of a portfolio or basket that tracks the yield and return of its native index. The main difference between ETFs and other types of index funds is that ETFs don't try to outperform their corresponding index, but simply replicate its performance. ETFs have been in use since the early 1980s.

ETFs combine the range of a diversified portfolio with the simplicity of trading a single stock. Investors can purchase ETF shares on margin, short sell shares, or hold for the long term.

The purpose of an index ETF is to match a particular market index, leading to a fund management style known as passive management. Passive management is the chief distinguishing feature of ETFs, and it brings a number of advantages for investors in index funds. Essentially, passive management means the fund manager makes only minor, periodic adjustments to keep the fund in line with its index. This is quite different from an actively managed fund where the manager continually trades assets in an effort to outperform the market. Because they are tied to a particular index, ETFs tend to cover a discrete number of stocks, as opposed to a mutual fund whose scope of investment is subject to continual change. For these reasons, ETFs mitigate the element of "managerial risk" that can make choosing the right fund difficult.

Because an ETF tracks an index without trying to outperform it, it incurs fewer administrative costs than actively managed portfolios. Typical ETF administrative costs are lower than an actively managed fund, coming in less than 0.20% per annum, as opposed to the over 1% yearly cost of some mutual funds. Because they incur low management and sponsor fees, and because they don't typically carry high sales loads, there are fewer recurring costs to diminish returns.

Passive management is also an advantage in terms of tax efficiency. ETFs are less likely than actively managed portfolios to experience the trading of securities, which can create potentially high capital gains distributions. Fewer trades into and out of the trust mean fewer taxable distributions, and a more efficient overall return on investment. Efficiency is one reason ETFs have become a favored vehicle for multiple investment strategies—because lower administrative costs and lower capital gains taxes put a greater share of your investment dollar to work for you in the market.

ETF shares trade exactly like stocks. Unlike index mutual funds or UITs, which are priced only after market closings, ETFs are priced and traded continuously throughout the trading day. They can be bought on margin, sold short or held for the long-term, exactly like common stock. Yet because their value is based on an underlying index, ETFs enjoy the additional benefits of broader diversification than shares in single companies, as well as what many investors perceive as the greater flexibility that goes with investing in entire markets, sectors, regions, or asset types. Because they represent baskets of stocks, ETFs typically trade at much higher volumes than individual stocks. High trading volumes mean high liquidity, enabling investors to get into and out of investment positions with minimum risk and expense.

One major drawback to an ETF is the cost, risk, and complexity of bringing an ETF to market. Accordingly, there is a need for systems and methods for reducing the cost, risk, and complexity of bringing an ETF to market.

Accordingly, there is a need for systems and method for creating an index exchange-traded fund using a convertible unit investment trust, as described herein.

BRIEF SUMMARY OF THE INVENTION

To meet the needs described above and others, the present disclosure provides systems and methods for creating an index exchange-traded fund using a convertible unit investment trust. Briefly, the invention creates a convertible unit investment trust (UIT) that forms the basis of a relatively inexpensive Exchange Traded Fund creation system and method.

By using this UIT, a UIT sponsor can provide a process for an asset manager's indexed strategies to become available to the general investing public, via a relatively inexpensive public offering of an unit investment trust. Subsequent to the UIT deposit, as certain, upon reaching a conversion threshold, the UIT can be converted into a purpose built Exchange Traded Fund (ETF) and brought to market as a new vehicle with a more beneficial ongoing tax, expense and longevity profile as compared to the initial, incubation UIT.

There are a number of systemic and financial issues that can be answered through the present invention. For index based strategies it has been demonstrated that an ETF is the most cost effective, tax efficient and investor friendly fund structure available to the full spectrum of investors—from the individual, small investor through whole range of institutional and pension investors. However, the cost of bringing an ETF to the market is relatively high and the level of required seed money needed to launch an ETF is prohibitive. These facts typically create a barrier to entry for an individual asset manager and can increase the investment risk to a sponsor who might want launch an ETF for a relatively new and untried strategy. Therefore a large number of strategies that could be beneficial to investors might never see the light of day. This, by definition, plays to the benefit of the larger, established broker dealers and therefore restricts the investable options for the general public to the products determined by a limited few who can control what is offered and thereby support a cost structure that would probably be more efficient if the barrier to entry was not so great.

A UIT, on the other hand, is a relatively cost effective way to introduce a new strategy or index to the public market. The UIT product structuring costs are around 10% of the ETF structuring costs and thereby significantly reduce the risk of offering new and different strategies to the public market. The UIT also provides for sales commissions so the distribution system is incentivized to broadly offer investment information and the registered fund to all investors. The issues for a UIT are that it can have a very limited offering period (generally 3-6 months for shorter term UITs), it is generally considered costly for its limited life (typically 2 years+/− for equity funds) and the UITs mandatory termination can create an unwanted tax event and cause the UIT investor to exit a strategy regardless of that investor's desire to hold.

As described, the convertible UIT targets an index portfolio. The index provider arranges with IOPV to calculate and price the target index. The custodian/trustee contracts with broker/dealer for agency desk trades of in kind for index rebalance. The convertible UIT portfolio is initially filed to match target index portfolio. Any changes in the target index constituents will be matched in the UIT portfolio holdings along with any rebalancing. All portfolio holdings changes will be done in-kind so as not to trigger taxes within the UIT.

In an embodiment, the convertible UIT portfolio may have a ten-year life plus maturity and may elect the index exemption. The convertible UIT may be listed using a BATS listing notice. The convertible UIT may include an election to convert that is determined in the prospectus at purchase. Additionally, the UIT may include units that are available with a sales charge or for fee accounts.

When the stated triggers for reorganization are met, the convertible UIT will automatically make a final adjustment to the portfolio holding to match the target index and clear liabilities. The UIT will then reorganize from a UIT to the ETF with a tax free delivery of the UIT portfolio holdings to the ETF in kind. The units will then be terminated, new ETF shares issues and creation units established. The new ETF shares 90 delivered to designated brokerage accounts and confirms sent to shareholders. The Final ETF may then have a full BATS listing with authorized participants/distributor relationship instituted.

Accordingly, the exchange traded fund creation systems and methods disclosed herein enables the incubation of an ETF through the use of an investment trust.

In an embodiment, a computer-implemented method for providing an exchange traded fund comprising the steps of: providing a unit investment trust including a plurality of ownership units, wherein the unit investment trust includes a portfolio of securities composed in accordance with an index; distributing the ownership units of the unit investment trust to one or more investors; providing an exchange traded fund including a plurality of ownership shares; upon the occurrence of a conversion event, tendering the portfolio of securities to the exchange traded fund in return for an in-kind distribution of the plurality of ownership shares; and distributing the plurality of ownership shares to the one or more investors according to a predetermined ratio of ownership units to ownership shares.

In some embodiments, the unit investment trust is structured as a registered investment company. In some embodiments, the method includes the further step of: listing one or more CUSIP numbers of the unit investment trust on an exchange, wherein, at least one CUSIP includes a convertible feature. In some embodiments, upon creation, the unit investment trust elects an index exemption for portfolio construction and maintenance.

In some embodiments, the conversion event has occurred when the dollar net asset value of the portfolio holdings meets a predetermined value. In some embodiments, the conversion event has occurred upon reaching a predetermined date. In some embodiments, upon the occurrence of the conversion event, calculating the predetermined ratio.

An object of the invention is to provide a solution to reduce the cost, risk, and complexity of bringing an ETF to market.

An advantage of the invention is that it reduces the barrier to entry to the creation of an ETF and allows more strategies to go to market thus providing for better pricing and fee structures to the broader investment market through greater competition.

Another advantage of the invention is that it provides low-cost, tax-efficient methods to launch ETFs that track novel indexes desired by investors.

A further advantage of the invention is that it provides a conversion that will not trigger a tax event.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE INVENTION

Figure 1:
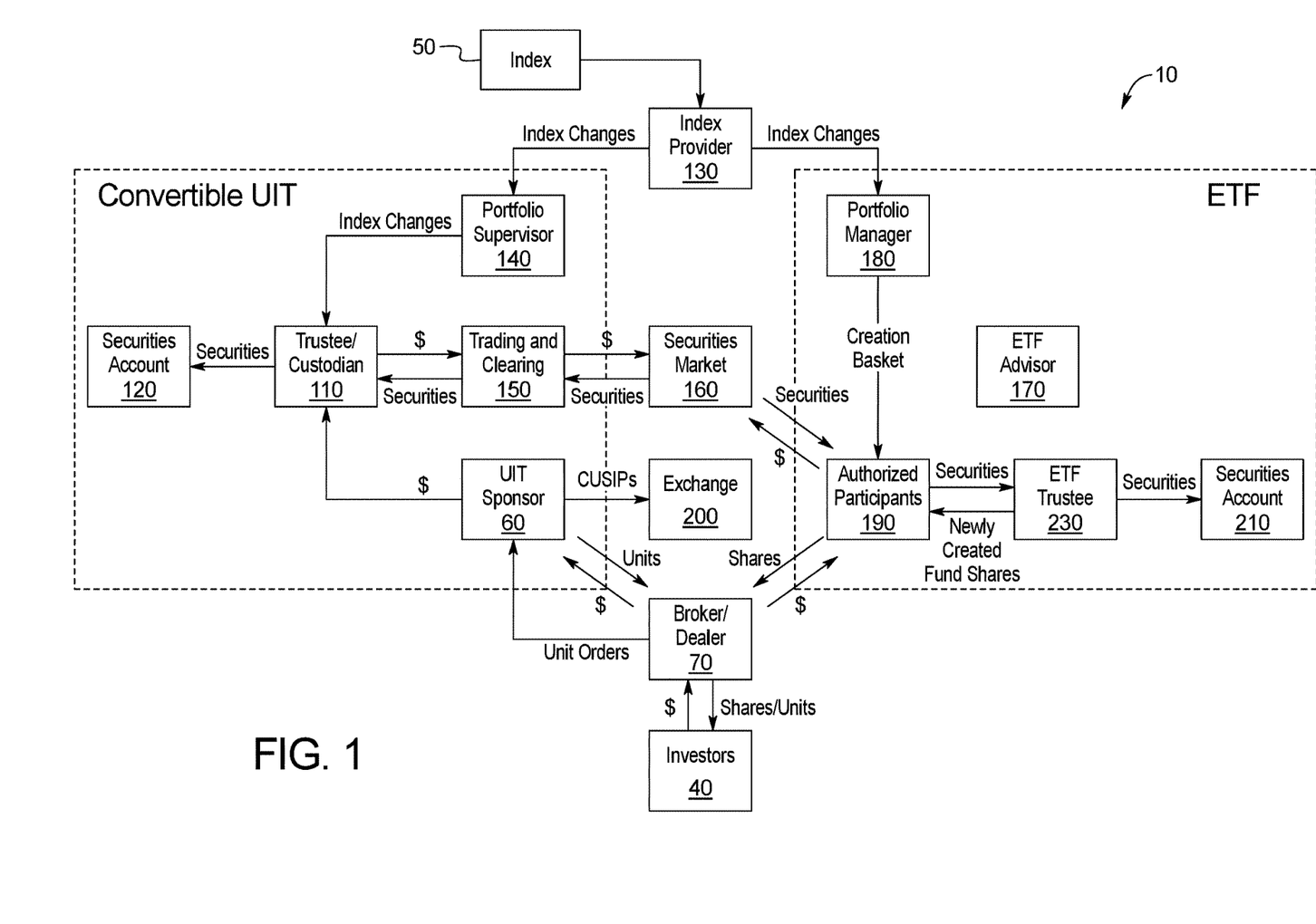
FIG. 1 is a diagram illustrates a generalized exchange-traded fund creation system of the present disclosure.
Figure 2A:
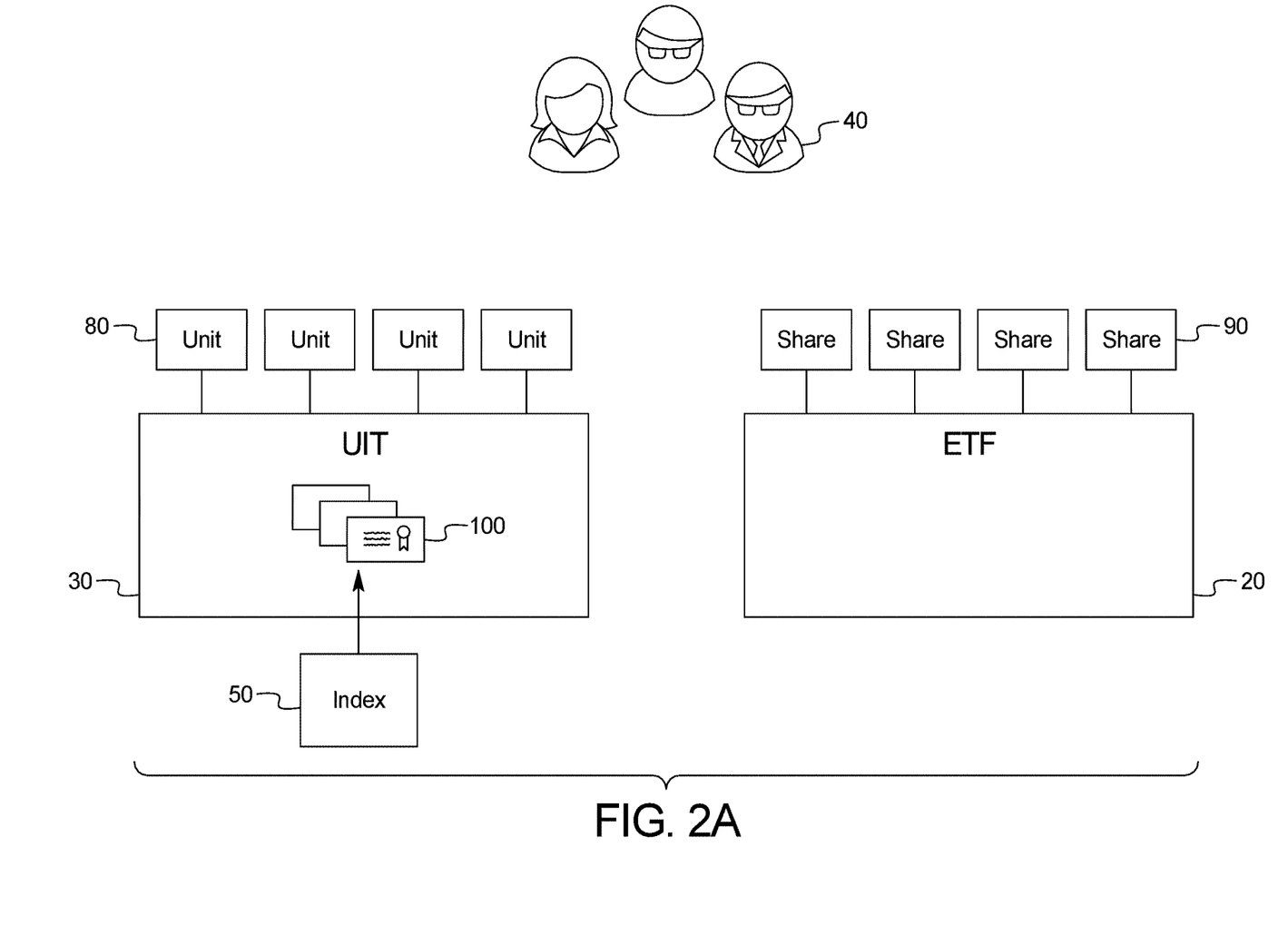
FIG. 2A is a diagram illustrating initial steps of an exchange-traded fund creation method.
Figure 2B:
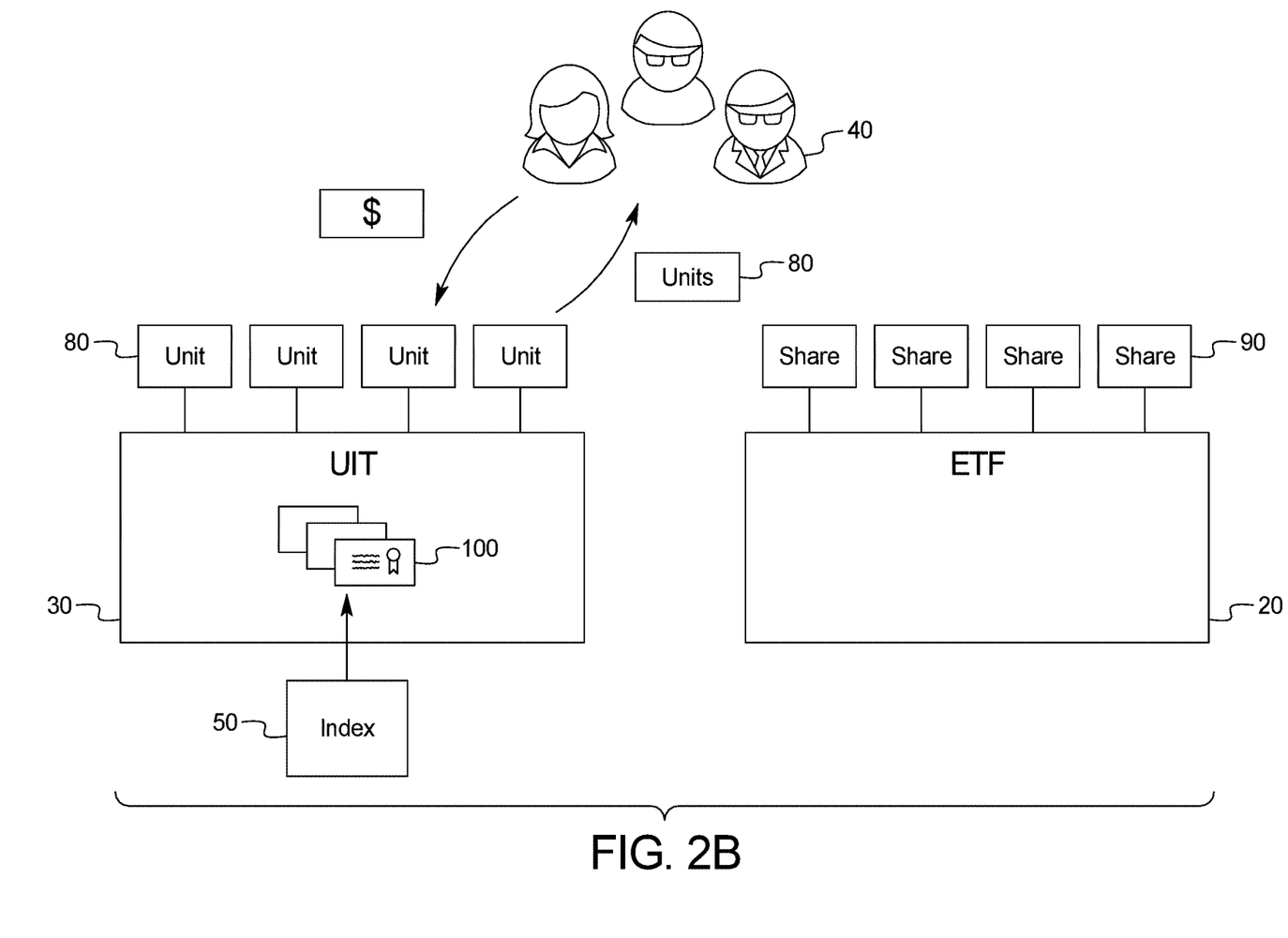
FIG. 2B is a diagram illustrating the distribution steps of an exchange-traded fund creation method.
Figure 2C:
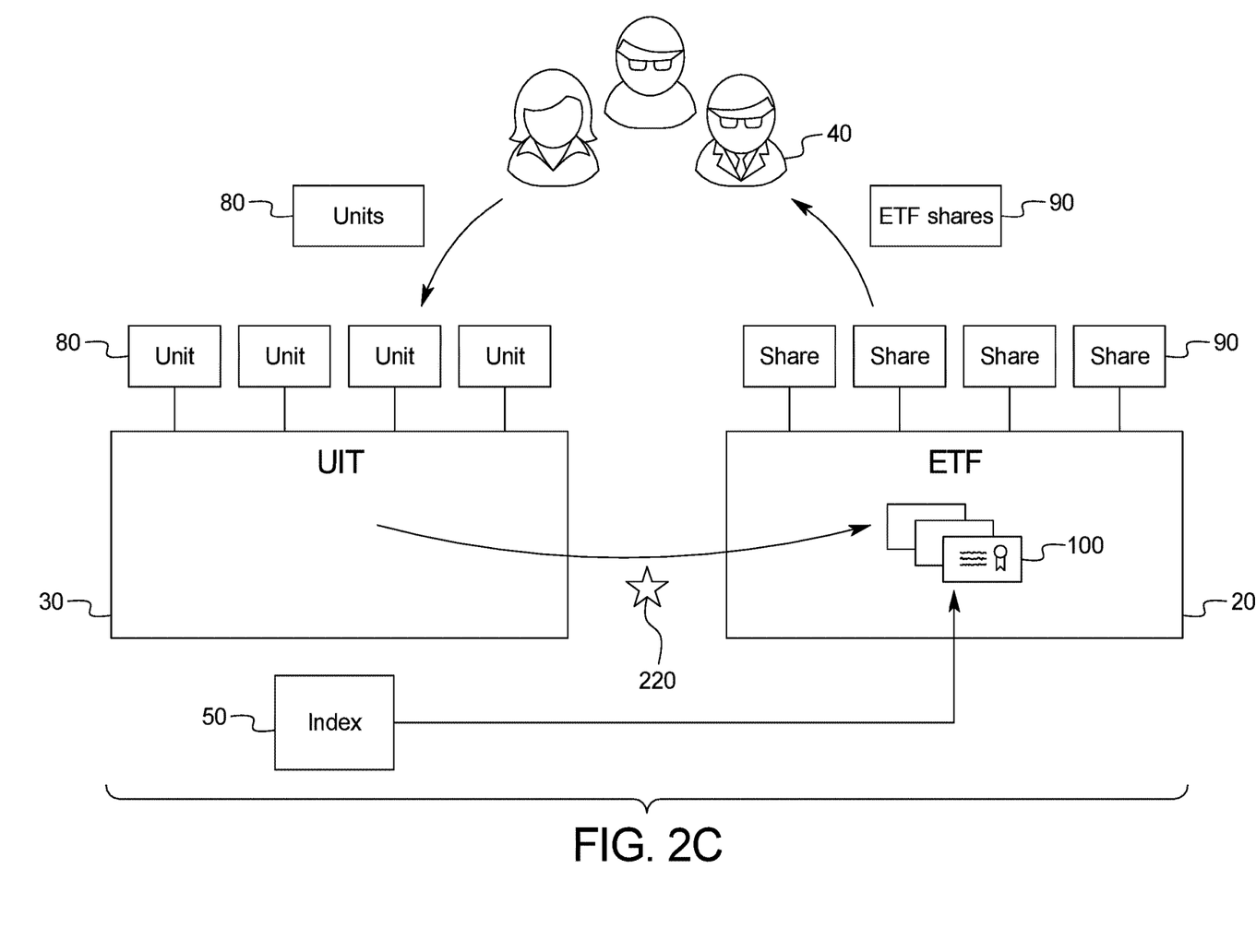
FIG. 2C is a diagram illustrating the exchange steps of an exchange-traded fund creation method.

FIG. 1 illustrates a generalized exchange-traded fund creation system 10 which allows for the low-risk, relatively inexpensive creation of an indexed exchange-traded fund 20 ("ETF 20") that is incubated using a convertible unit investment trust 30 ("UIT 30"). FIGS. 2A-2C illustrate the steps of an exchange-traded fund creation method 300 of FIG. 3.

As shown in FIG. 1, investors 40 may desire to own a fund that tracks a desired index 50. Likewise, a UIT 60 sponsor may desire to create an ETF 20 (FIG. 2A-2C) to track that index 50. In order to accomplish the creation of the ETF 20, the UIT sponsor 60 may begin by creating a convertible unit investment trust 30 that converts to an ETF 20 upon reaching a threshold 220 (FIG. 2C).

As shown, the investors 40 may purchase the UIT 30 through broker/dealers 70 that may act as an agent for the investor 40 to purchase units 80 (FIG. 2A) in the UIT 30 and, ultimately, to receive ETF shares 90 on behalf of the investors 40. The UIT sponsor 60 may receive funds for units 80 of the unit investment trust 30 and may direct the creation of units 80. Portfolio holdings 100 of the UIT 30 may be held or administered by a UIT Trustee 110 for the benefit of the UIT 30. The UIT trustee 110 may keep the portfolio holdings 100 in a custodial account 120.

An index provider 130 will need to communicate with the portfolio supervisor 140 to initially provide the information as to the index universe and the index creation rules that allow an index calculation agent to produce/replicate the portfolio that represents the index intent by following the index creation rules.

When the UIT 30 is created, or the index 50 is re-calculated and changes are required, the portfolio supervisor 140 may send a new portfolio to a trading and clearing subsystem 150 with very specific details as to securities identifiers, share amounts to be bought and sold and the current prices of the securities. The trading and clearing subsystem 150 may manage the purchase, sale and clearing of the securities from securities markets 160 as needed to track the index 50.

An ETF advisor 170 (which may also be the UIT sponsor 60) may manage the ETF 20 by seeing through its initial creation through to an exchange mechanism. The ETF 20 may initially be only a shell until the exchange mechanism is triggered. The ETF advisor 170 may arrange for a portfolio manager 180 for the ETF 20. The portfolio manager 180 is the person or persons responsible for investing the portfolio holdings 100 of the ETF 20, implementing its investment strategy, and managing the day-to-day portfolio trading. The ETF advisor 170 may additionally chose authorized participants 190 to undertake the responsibility of obtaining the underlying assets needed to create an ETF 20. During the exchange mechanism, the portfolio holdings 100 may be transferred to the authorized participant 190 that creates the initial creation baskets of the ETF 20. The authorized participant may deposit the portfolio holding 100 with the ETF Trustee 230 and receive newly created ETF shares 90 in return. The ETF shares 90 may then be transferred to the investors 40 via the broker/dealers 70.

Figure 3:
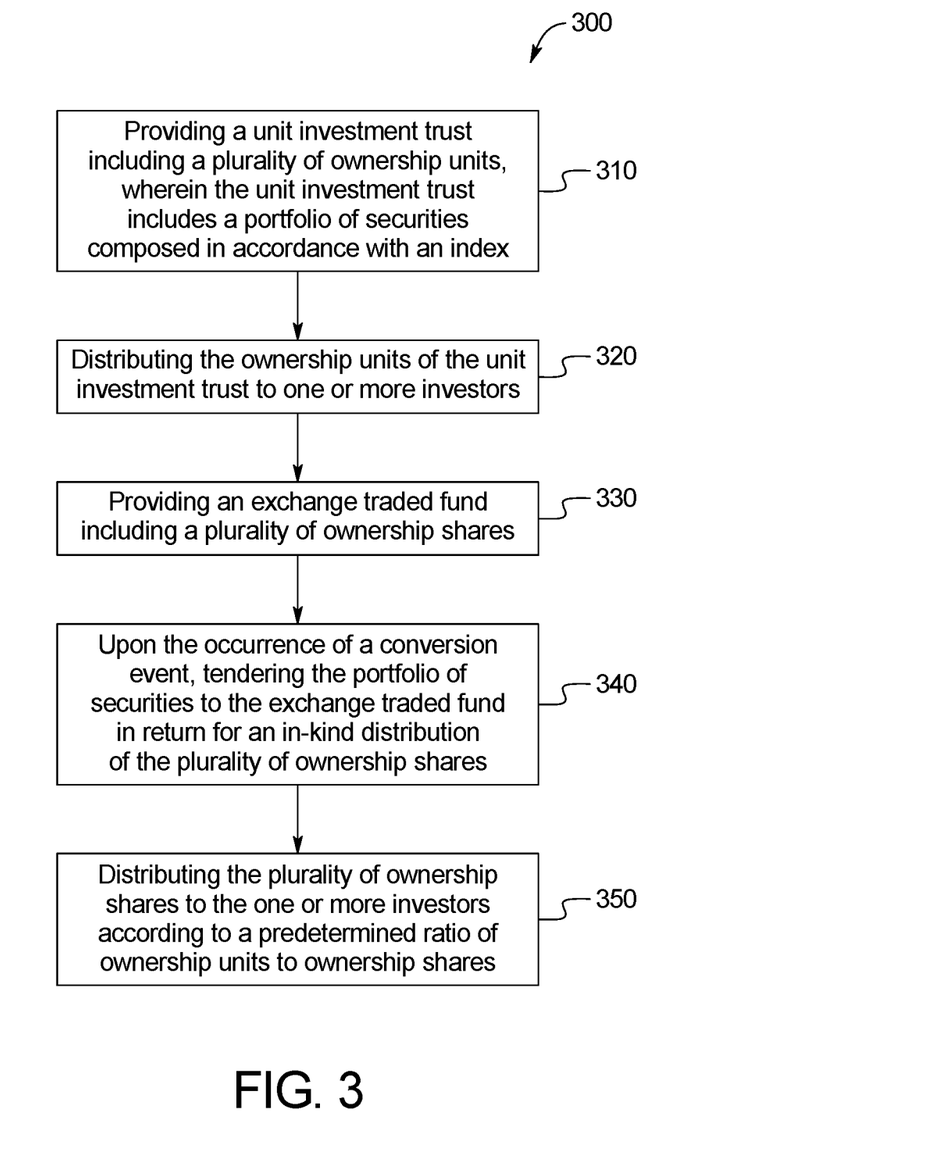
FIG. 3 is a flow chart illustrating an exchange-traded fund creation method.

As shown in FIG. 3, in an embodiment, the exchange-traded fund creation method 300 may include the steps of: at step 310, providing a unit investment trust including a plurality of ownership units, wherein the unit investment trust includes a portfolio of securities composed in accordance with an index; at step 320, distributing the ownership units of the unit investment trust to one or more investors; at step 330, providing an exchange traded fund including a plurality of ownership shares; at step 340, upon the occurrence of a conversion event, tendering the portfolio of securities to the exchange traded fund in return for an in-kind distribution of the plurality of ownership shares; and, at step 350, distributing the plurality of ownership shares to the one or more investors according to a predetermined ratio of ownership units to ownership shares.

FIGS. 2A-2C illustrate the conversion of a UIT 30 into an ETF 20. As can be seen beginning in FIG. 2A, the exchange-traded fund creation method 300 proceeds from the creation of the UIT 30 and the shell ETF 20 (FIG. 2A), to the initial investment in the UIT 30 (FIG. 2B), and to the meeting of a threshold 220 to the triggering of an exchange mechanism and the disbursement of final ETF shares 90 to the investors 40.

As shown in FIG. 2A, the exchange-traded fund creation method 300 may begin with a UIT 30, structured as a registered investment company and electing to rely on the index exemption for portfolio construction and maintenance. In theory and in practice, the UIT 30 and the identified target index 50 will hold generally the same portfolio constituent securities over time.

In an embodiment, the UIT 30 will be structured to operate as a standard passive UIT 30. The UIT 30 may have a predetermined maturity date. In an embodiment, the UIT's life will generally be ten years. In other embodiments, the UIT 30 may have a life of two to five years. On the first offering day, in an embodiment, the UIT 30 will contain a portfolio of securities, the portfolio holdings 100, that, in an embodiment, are identical to the constituents of its index 50, both of which may be disclosed in the IUT's prospectus. Units 80 of each UIT 30 may be sold subject to initial and/or deferred sales charges as permitted by an exemption order that will have been granted prior to the offering of units 80.

For example, the UIT 30 may be created with an up front sales charge or fee based options but typically no deferred sales charge. In an embodiment, units 80 of each UIT 30 may be issued and redeemed at NAV, either in cash or in-kind at the sponsor's election.

After sale of the units 80, the portfolio holdings 100 may be kept unchanged, except that additions or deletions will be made to conform to the constituents of the index 50 that may change from time to time. In an embodiment, deletions from a UIT's portfolio holdings 100 may be made "in kind" to a redeemer tendering the requisite number of units 80 (in an embodiment, such units 80 will be cancelled). Additionally, in an embodiment, additions to replace such deletions may also be made "in kind" by a purchaser of the requisite number of new units 80.

Concurrently with the creation of the UIT 30, a target shell ETF 20 may be created and launched. The ETF 20 may be structured as a passive index open-end management company. The board of directors and service providers of the ETF 20 may be required to agree to maintain the shell at no costs. This target ETF 20 may have all the filing and service provision agreements in place so at the time of conversion the ETF 20 will be ready for the reorganization and issue shares for units in the ratio determined at the reorganization time.

Turning to FIG. 2B, shown is an illustration of the step of distributing the ownership units 80 of the UIT 30 to one or more investors 40 via their broker/dealers 70 (the units 80 are held at the custodian in book entry). In an embodiment, the sponsor 60 may seek to list the UIT 30 on BATS or another exchange 200. In an embodiment, this listing will be for notice purposes only—the units would not trade on the exchange 200, but may be sold in the secondary market if the sponsor 60 maintains such a market. Even if listed on the exchange 200, the UIT's other procedures, processes, operational arrangements and sales charges may be the same as that of a standard unit investment trust.

Figure 4:
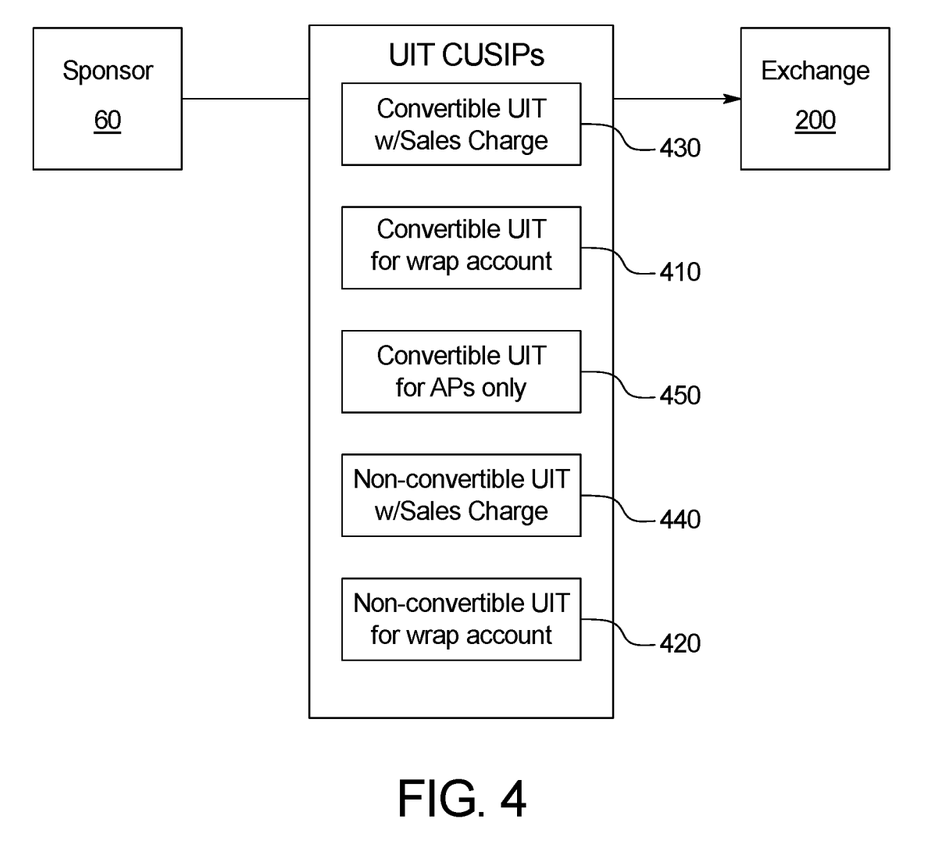
FIG. 4 is a diagram illustrating the listing of CUSIPs on an exchange.

As an example of a listing of the UIT 30 on an exchange, as shown in FIG. 4, the UIT 30 may have five different CUSIPs. In an embodiment, the first CUSIP listing 410 is front load unit with a convertible feature that will be part of a single reorganization conversion of all eligible units into the existing parallel ETF upon reaching the threshold. The second CUSIP listing 420 may be the front-end load without electing to convert at the time of the reorganization, however, it may include an option to convert from a unit of the second listing to a unit of the first listing prior to a conversion to an ETF. A third CUSIP listing 430 and a fourth CUSIP listing 440 may be fee-based version of the prior two CUSIPs—one with a convertible character and one with out. In an embodiment, a fifth CUSIP listing may be provided to enable a potential ETF authorized participants 190 to take a position in the product and speed its way to the market. The fifth CUSIP listing 450 would be priced to allow relatively flat fees and may be set up to where the potential authorized participants 190 could contribute in kind to the UIT 30.

Figure 5:
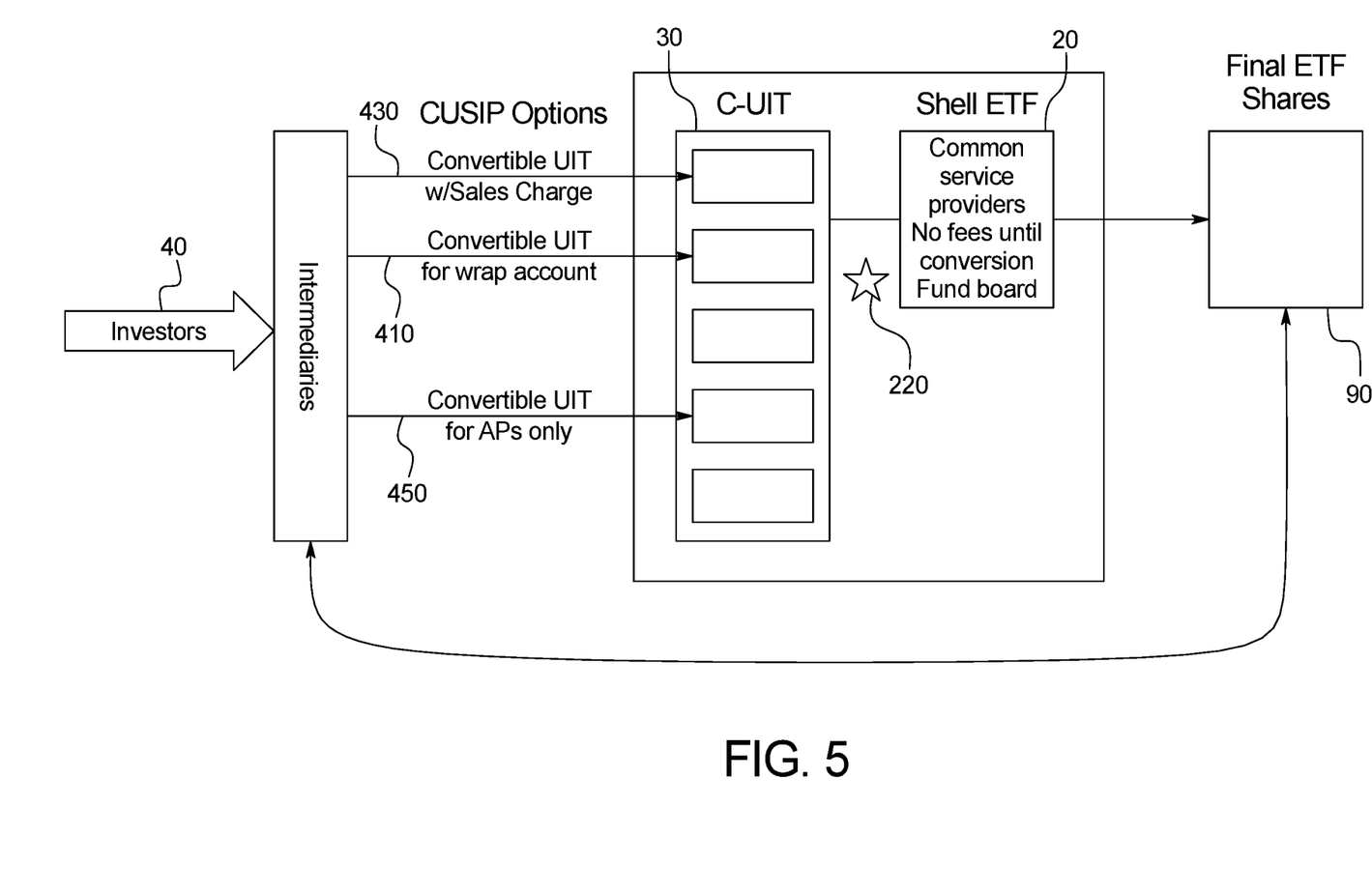
FIG. 5 is a diagram illustrating the creation of an exchange-traded fund including listing of CUSIPs on an exchange.

FIG. 5 illustrates a second example of a convertible UIT 30 that does not include non-convertible CUSIPs. It is contemplated that regulators, such as the SEC, may require that the covert ability needs to be all or nothing. Accordingly, in the embodiment shown, the UIT 30 includes the first CUSIP listing 410 to provide a front load unit with a convertible feature that will be part of a single reorganization conversion of all eligible units into the existing parallel ETF upon reaching the threshold. The UIT 30 may also include the third CUSIP listing 430 as a fee-based version of the first CUSIP listing 410, while the fifth CUSIP listing 450 would be priced to allow relatively flat fees and may be set up to where the potential authorized participants 190 could contribute in kind to the UIT 30. Upon the triggering of the conversion event 220, the shell ETF 20 is activated and the ETF shares 90 are transferred to intermediaries, such as the broker/dealers 70.

In an embodiment, proactive election to convert will be accomplished through the selection of the appropriate CUSIP at the time of the initial investment and thereby obviating the need for the unit holder to vote for the conversion.

Turning to in FIG. 2C, upon reaching a threshold, the UIT 30 may be reorganized into an ETF 20. The Units 80 of the UIT 30 may be converted to ETF shares 90 on a predetermined basis, such as, a one to one basis, or on another ratio as determined at time of conversion. Upon conversion, the initial UIT unitholders will become ETF shareholders. In an embodiment, the conversion will be executed as a reorganization of one registered investment company to another registered investment company and therefor should not trigger a tax event for the UIT investors 40 who elect to convert via their purchase or exchange into the convertible CUSIP listing.

The UIT 30 may have an associated threshold 220, or conversion event, that triggers the conversion from the UIT 30 to the ETF 20. For example, in one embodiment, the threshold 220 may be a dollar net asset value ("NAV") of the portfolio holdings 100. For example, the threshold 220 may be reached when the assets under administration reach levels of $45 million. In another embodiment, the threshold 220 may be a calendar date, such as a predefined termination date. (The termination date may be determined at the creation of the UIT 30, but may be delayed such that the termination date is achieved not before a year and a day has passed since initial deposit.) An additional threshold 220 may be defined by an ownership percentage, for example, if a predetermined number or percentage of investors 40 has purchased units 80 with a front load unit with a convertible feature, then the threshold 220 is reached.

In an embodiment, the UIT 30 may have multiple thresholds 220, such as a dollar NAV and a calendar date. Alternatively, the threshold 220 may be an ownership percentage of convertible units 80 and a dollar NAV. In an embodiment, upon reaching at least one threshold, an automatic exchange offer to provide shares of the ETF 20 in exchange for shares of the UIT 30 will commence. Alternatively, in other embodiments, the system 10 may require that each threshold 220 be met before the conversion is begun.

As detailed in FIG. 2C, upon reaching the threshold 220, a conversion event is triggered. Once the conversion is triggered, in an embodiment, the initial UIT fund will terminate and the UIT 30 will be reorganized into an ETF. The reorganization is a one time, RIC to RIC reorganization that will require that the portfolio holdings 100 and associated details be transferred from the custodial account 120 of the UIT 30 and delivered to the ETF custodial account 210. This physical delivery may be accomplished at one time with all the constituent information transferred correctly and intact to the ETF custodial account 210 with tax, ownership and holdings information moved completely and accurately. The new ETF shares 90 are then delivered to correct individual brokerage account at the investors broker/dealer 70.

This reorganization will benefit the investor 40 as it allows a conversion that will not trigger a tax event, and puts the investor in an ETF 20 that is potentially more cost effective, definitely a more tax efficient option (no mandatory liquidation or internal fund generated taxes); among other benefits. Additional benefits may include: no termination date, and the benefit of intra-day pricing in the ETF, and the ability to short the fund in an ETF (which is not present in a UIT).

The UIT 30, for US tax purposes, may be structured as a regulated investment company. The UIT 30 may be subject to termination in the normal course if the UIT 30 reaches its maturity date without exceeding its threshold. In addition, in an embodiment, the UIT 30 will be subject to termination earlier than the maturity date if the exchange mechanism occurs.

The UIT 30 may be associated with a prospectus listing the associated threshold or thresholds 220. The prospectus may state that if one or both thresholds are reached, an automatic exchange offer of units 80 of the UIT 30 for ETF shares 90 will commence. The prospectus may provide a brief description of the exchange process, including the fact that the acquisition of Shares will be made pursuant to the terms and conditions stated in the ETF prospectus. The prospectus may also prominently state that ETF shares 90 are not redeemable and can only be sold in the secondary market through a broker/dealer 70 at current market prices, not NAV and that brokerage commissions may be incurred.

In some embodiments, the system 10 may notify investors 40 when the threshold 220 is met by presenting the investors 40 with an exchange offer. When presented with an exchange offer, in an embodiment, investors 40 can choose between: automatically accepting ETF shares 90 in replacement of their units at NAV on an exchange date or tendering their units 80 to the sponsor 60 for redemption in-kind or in cash at NAV prior to or on the exchange date. If an investor 40 fails to tender his or her units 80, such units 80 may automatically be exchanged at NAV for ETF shares 90 on the exchange date.

The exchange mechanism may operate in an automatic fashion if the threshold 220 is triggered; that is, there will be no discretion on the part of either the sponsor 60 or the trustee 110 to choose to continue to operate as a UIT 30. In an embodiment, the trust agreement will authorize the trustee 110 and the sponsor 60 on behalf of the UIT, to enter into an exchange agreement with the ETF 20 and to terminate the UIT 30.

In an embodiment, the trust agreement will specify that the UIT 30 may only be exchanged with an ETF that utilizes the same index 50 and holds the same portfolio holdings 100 as that of the UIT 30, so that when the exchange process is completed, the owners of the ETF shares 90 will be exposed to the performance of the identical index 50 and portfolio holdings 100 of the UIT 30 on the exchange date when the UIT 30 exchanges its units 80 for ETF shares 90.

An Index License Agreement may be structured and negotiated at the outset to permit the sponsor 60 and the ETF advisor (which may be the same entity) to be the licensee of the index 50 and to sub-license both the UIT 30 and the ETF 20. The exchange mechanism may be described in plain English in each UIT's prospectus, fact sheets and other advertising material, if any and may be highlighted on the UITs' webpage or the user interface of the system.

In an embodiment, upon triggering the threshold 220, the investors 40 may be notified that the will have the choice, either to: continue to hold their UIT units 80 which will be automatically exchanged at NAV for ETF shares on the exchange date, or tender their units 80 to the sponsor for redemption at NAV in kind or in cash prior to or on the exchange date; and if an investor 40 fails to tender its units 80 by the exchange date, such units will be automatically exchanged at NAV for shares on the exchange date. Investors 40 may be notified through the user interface of the system 10, via electronic mail, etc., and investors 40 may indicate their choice to the system 10 via the user interface.

The investors 40 may be notified that any investor 40 receiving ETF shares 90 in exchange for units 80 on the exchange date will be deemed to have consented to the appointment of the ETF Board and to the approval of the advisory contract with the ETF advisor 170. For example, the investors 40 may be notified when the threshold 220 is reached and the investors may be given the choice to receive ETF shares 90 or tender their units 80 for redemption. In an embodiment, the Trust Agreement, Information Materials, the Website and each ETF's prospectus will contain a statement that any investor 40 receiving ETF shares 90 in exchange for units 80 on the exchange date will be deemed to have consented to the appointment of the ETF Board and to the approval of the advisory contract with the ETF advisor.

Additionally, when the threshold 220 is reached, the system 10 may publish a press release and place a copy on the website or the user interface of the system 10. The system may further alert the broker-dealer community and may automatically, or via instructions to the trustee, send a notice to investors 40 via their registered representatives via the Capelogic UIT trading system.

The notice may state: the record date for the exchange date (e.g., "not less than - - - days" nor "more than - - - days" following the date that the notice was published); the exchange date and termination date; that the exchange, and offer of ETF shares 90, can only be made pursuant to its ETF prospectus which will be distributed to all investors 40; that all costs relating to the exchange mechanism will be borne by the ETF advisor 170 and not the trust nor the ETF; that all units tendered to the trustee for redemption prior to the exchange date and all units replaced with ETF shares 90 will be priced at "Final NAV"; that on the exchange date (or a specified date prior to the exchange date), pursuant to the agreement, the trustee 110 will deduct all outstanding costs and expenses of the trust and apply them on a pro-rata basis for all investors 40 prior to calculating the trust's final NAV ("Final NAV"); that all units 80 tendered to the trustee 110 for redemption on the exchange date and all units 80 exchanged for ETF shares will be priced at final NAV; that ETF shares 90 must be held in a brokerage account and provide investors 40 with instructions as to how to contact a broker/dealer 70 and/or the distributor if they do not have such an account; that ETF shares 90 are not redeemable and can only be sold in the secondary market through a broker/dealer 70 at current market prices, not NAV and that brokerage commissions may be incurred; that any investor 40 receiving ETF shares 90 will be deemed to have consented to the appointment of the ETF Board and to the approval of the ETF's advisory contract with the ETF's Advisor; that only initial ETF shares 90 resulting from the tender of units 80 for an exchange of ETF shares 90 may be an initial creation unit size that may differ from all future creation units of the ETF shares 90; and that all units 80 will be converted into whole ETF shares 90 with any fractional shares to be distributed in cash. In an embodiment, the exchange mechanism may commence operation only if both the threshold 220 is triggered and an ETF exists and is operational prior to the exchange date.

The agreement may provide that the sponsor 60 of the UIT 30 must notify the trustee 110 within a predetermined number of business days that the threshold 220 has been reached, and that the trustee 110 must send the notice to all investors 40 within a set number of days of receipt of such notice from the sponsor 60.

The agreement may provide that if the threshold 220 is triggered before the end of the UIT's public offering period, the sponsor 60 will: immediately direct the trustee 110 to cease issuing new units 80; and publish a press release and notify the public that the offering period has ended because the threshold 220 has been reached.

The trust agreement may also contain specific powers, procedures and instructions for both the sponsor 60 and the trustee 110 to implement the exchange mechanism, including that: the sponsor 60 will be authorized to do any and all things necessary to effectuate the exchange of UIT units 80 into the ETF shares 90 of an ETF established by the sponsor which will use the same index 50 and contain the same portfolio holdings 100 of the UIT 30 as are held on the exchange date, including arranging for the delivery of a prospectus to each investor 40 of record; the trustee 110 may additionally be authorized to do any and all things necessary to assist the sponsor 60 in facilitating the exchange of the units for the ETF shares 90, making final redemptions and terminating the trust; including transferring all units 80 held as of the record date to the ETF's transfer agent for exchange into ETF shares 90 on the exchange date and cancellation of such units 80; making a custodial transfer (i.e., at no cost) of the requisite pro-rata portion of all portfolio holdings 100 to the ETF's custodian effecting all tenders of units 80 for redemption at a final NAV; paying out in-kind and/or selling the requisite prorate portion of all of the UIT's portfolio holdings 100 necessary for receipt of redemption proceeds and providing such payments to redeeming investors 40; and transferring any license agreements and other intellectual property, if any, to the ETF 20.

Before the exchange date, the ETF 20 can be established under state law and registered with the Securities and Exchange Commission under the Investment Company Act of 1940 Act as an open-end management investment company.

In an embodiment, the ETF 20 will be structured and operated as a passive index exchange-traded fund in accordance with the terms and conditions of its exemptive orders granting relief under the 1940 Act. The ETF 20 may preferably be operational before the exchange date and may have, among other things: a board of trustees or directors, the majority of whom will be independent; an advisor registered with the Commission under the Investment Advisors Act of 1940 and an advisory agreement with the ETF advisor 170; an initial shareholder; a Code of Ethics and a compliance officer; all service providers necessary to operate the ETF 20 including its administrator, custodian, securities lending agent, insurance provider, DTCC and at least one authorized participant; all agreements, contracts, board resolutions and authorizations necessary to operate the ETF 20 and to list the ETF shares 90 on the exchange; and all service providers, agreements, contracts, board resolutions and authorizations necessary to conduct the exchange transaction and issue and exchange its ETF shares 90 in exchange for UIT units and the pro-rata portfolio holdings 100.

It is intended that, as the UIT 30 and the ETF 20 are registered investment companies that will be holding the same portfolio holdings 100, the exchange of units 80 for ETF shares 90 will occur on a tax-free basis.

The ETF 20 may be established as a registered passive index open-end management company with portfolio holdings 100 comprised of equity securities and debt securities, as well as securities issued by funds of closed-end funds and Funds of ETFs, and any combination thereof. The ETF 20 may be structured and operated in a manner that will be compliant with the terms and conditions of the order without any amendment or modification. Should any ETF 20 fail to meet all terms and conditions of the order, amendment to, such order will be made to the Commission by the advisor, and receipt of such requested amended relief must be received, in advance of the exchange date.

The UIT 30 may be a registered unit investment trust based on an index 50. In an embodiment, the UIT 30 will transfer on a pro-rata basis its portfolio holdings 100 to the ETF 20 which will be a registered passive open-end management company utilizing the identical index as the UIT 30.

The portfolio holdings of the UIT 30 may be comprised of equity securities and debt securities, as well as securities issued by funds of closed-end funds and funds of ETFs, and any combination thereof, and will be transferred "in kind" through DTCC and under NSCC to the ETF's custodian for deposit into the ETF's portfolio on the exchange date. Therefore, once the exchange is consummated and the portfolio holdings have been transferred to an ETF, such ETF will meet the conditions of one or more of an exchange's current passive ETF listing rules without any amendment or modification. Should any ETF fail to meet any condition of the relevant exchange's current passive ETF listing rules, amendment to such rules will be submitted to the Commission by such exchange, and adoption of such amendment must occur, in advance of the exchange date.

As noted, the UIT 30 will be a registered index unit investment trust with portfolio holdings 100 comprised of equity securities and debt securities, as well as securities issued by funds of closed-end funds and Funds of ETFs, and any combination thereof. These portfolio holdings 100 will be transferred "in kind" to the portfolio of each ETF on the exchange date. In most cases, each ETF will comply with all conditions, and therefore be able to rely upon, one or more of the ETF Class Relief letters, as applicable, without any amendment or modification. If an ETF's portfolio holdings do not permit it to rely upon relevant Existing Class Relief, application for relief will be made by the advisor 170 to the Commission in advance of the exchange date.

As noted, the ETF 20 will be structured as a passive index open-end management company with portfolio holdings 100 comprised of comprised of equity securities and debt securities, as well as securities issued by funds of closed-end funds and Funds of ETFs, and any combination thereof. Therefore, each ETF 20 will be able to rely on the Section 13(f) and Section 16(a) class relief letters without any amendment or modification.

It should be noted that various changes and modifications to the presently preferred embodiments described herein will be apparent to those skilled in the art. Such changes and modifications may be made without departing from the spirit and scope of the present invention and without diminishing its attendant advantages.

The invention claimed is:

1. A computer-implemented method for providing an exchange traded fund comprising the steps of:
   providing a unit investment trust including a plurality of ownership units, wherein the unit investment trust includes a portfolio of securities composed in accordance with an index,
   wherein, upon creation, the unit investment trust elects an index exemption for portfolio construction and maintenance;

distributing the ownership units of the unit investment trust to one or more investors;

providing an exchange traded fund including a plurality of ownership shares;

upon the occurrence of a conversion event, tendering the portfolio of securities to the exchange traded fund in return for an in-kind distribution of the plurality of ownership shares, wherein the conversion event is based on a dollar net asset value of the portfolio holdings meets a predetermined value, a predetermined date, or combinations thereof;

distributing the plurality of ownership shares to the one or more investors according to a predetermined ratio of ownership units to ownership shares; and listing one or more CUSIP numbers of the unit investment trust on an exchange, wherein, at least one CUSIP includes a convertible feature.

2. The computer-implemented method of claim 1, wherein the unit investment trust is structured as a registered investment company.

3. The computer-implemented method of claim 1, wherein the conversion event is the dollar net asset value of the portfolio holdings meeting a predetermined value.

4. The computer-implemented method of claim 1, wherein the conversion event is reaching a predetermined date.

5. The computer-implemented method of claim 1, wherein the predetermined ratio is calculated, upon the occurrence of the conversion event.

6. A computer-implemented method for providing an exchange traded fund comprising the steps of:

providing a unit investment trust including a plurality of ownership units, wherein the unit investment trust includes a portfolio of securities composed in accordance with an index;

distributing the ownership units of the unit investment trust to one or more investors;

providing an exchange traded fund including a plurality of ownership shares;

upon the occurrence of a conversion event, tendering the portfolio of securities to the exchange traded fund in return for an in-kind distribution of the plurality of ownership shares, wherein the conversion event is the dollar net asset value of the portfolio holdings meeting a predetermined value;

distributing the plurality of ownership shares to the one or more investors according to a predetermined ratio of ownership units to ownership shares; and listing one or more CUSIP numbers of the unit investment trust on an exchange, wherein, at least one CUSIP includes a convertible feature.

7. A computer-implemented method for providing an exchange traded fund comprising the steps of:

providing a unit investment trust including a plurality of ownership units, wherein the unit investment trust includes a portfolio of securities composed in accordance with an index;

distributing the ownership units of the unit investment trust to one or more investors;

providing an exchange traded fund including a plurality of ownership shares;

upon the occurrence of a conversion event, tendering the portfolio of securities to the exchange traded fund in return for an in-kind distribution of the plurality of ownership shares, wherein the conversion event is reaching a predetermined date;

distributing the plurality of ownership shares to the one or more investors according to a predetermined ratio of ownership units to ownership shares; and listing one or more CUSIP numbers of the unit investment trust on an exchange, wherein, at least one CUSIP includes a convertible feature.

\* \* \* \* \*